United States Patent [19]
Gelikonov et al.

[11] Patent Number: 5,867,268
[45] Date of Patent: Feb. 2, 1999

[54] OPTICAL FIBER INTERFEROMETER WITH PZT SCANNING OF INTERFEROMETER ARM OPTICAL LENGTH

[75] Inventors: Valentin M. Gelikonov; Grigory V. Gelikonov; Natalia D. Gladkova; Vladimir I. Leonov; Felix I. Feldchtein; Alexander M. Sergeev; Yakov I. Khanin, all of Nizhny Novgorod, Russian Federation

[73] Assignee: Optical Coherence Technologies, Inc., Cleveland, Ohio

[21] Appl. No.: 943,739

[22] Filed: Oct. 3, 1997

Related U.S. Application Data

[63] Continuation of Ser. No. 602,589, Feb. 16, 1996, abandoned.

[30] Foreign Application Priority Data

Mar. 1, 1995 [RU] Russian Federation ............. 95102921

[51] Int. Cl.$^6$ ...................................................... G01B 9/02
[52] U.S. Cl. ............................ 356/345; 356/73.1; 385/12
[58] Field of Search ..................................... 356/345, 358, 356/73.1, 35.5; 385/11, 12, 14

[56] References Cited

U.S. PATENT DOCUMENTS

| | | |
|---|---|---|
| 4,703,287 | 10/1987 | Fournier, Jr. et al. . |
| 5,056,885 | 10/1991 | Chinn . |
| 5,202,745 | 4/1993 | Sorin et al. . |
| 5,313,266 | 5/1994 | Keolian et al. . |
| 5,321,501 | 6/1994 | Swanson et al. . |
| 5,459,570 | 10/1995 | Swanson et al. ........................ 356/345 |

FOREIGN PATENT DOCUMENTS

| | | |
|---|---|---|
| 0 356 056 A1 | 2/1990 | European Pat. Off. . |
| 0 362 474 B1 | 4/1990 | European Pat. Off. . |
| 0 460 635 A2 | 12/1991 | European Pat. Off. . |
| 42 04 521 | 6/1993 | Germany . |
| 2191596 | 12/1987 | United Kingdom . |
| 2221999 | 2/1990 | United Kingdom . |
| 2234828 | 2/1991 | United Kingdom . |

OTHER PUBLICATIONS

X. Clivaz, et al. "High–resolution reflectometry in biological tissues", *Optics Letters*, vol. 17, No. 1, Jan. 1, 1992, pp. 4–6.

J.A. Izatt, et al., "Micron–resolution biomedical imaging with optical coherence tomography", *Optics & Photonics News*, vol. 4, No. 10, Oct. 1993, pp. 14–19.

E. A. Swanson, et al, "In vivo retinal imaging by optical coherence tomography", *Optics Letters*, vol. 18, No. 21, Nov. 1, 1993, pp. 1864–1866.

A. Sergeev, et al., "In vivo optical coherence tomography of human skin microstructure", *Proc. SPIE*, v. 2823, 1994, pp. 144–150.

(List continued on next page.)

*Primary Examiner*—Robert Kim
*Attorney, Agent, or Firm*—Pearne, Gordon, McCoy & Granger LLP

[57] ABSTRACT

The invention is related to technical physics, in particular to devices for investigating the internal structure of objects and can be used in medicine for diagnostics of human organs and systems, in particular for optical coherence tomography and in technical diagnostics, for example technological process control. The invention relates to the creation of an optical-fiber interferometer, which, being used in a device for optical coherence tomography, allows one to investigate media with short time of changing of optical characteristics or its position relative to the optical probe, for example biotissues in vivo. The invention also relates to the creation of a piezoelectric modulator, suitable for use in the interferometer and for providing the necessary scanning depth in the mentioned media. In the described optical fiber interferometer the piezoelectric modulator, constructed as a fiber optic piezoelectric controllable delay line, performs a function of the fiber part of the interferometer arm which allows one to change practically inertialess the optical path in the interferometer arm and consequently an optical path difference at least to several tens of the working wavelenghts.

27 Claims, 2 Drawing Sheets

OTHER PUBLICATIONS

J. A. Izatt, et al., "Optical coherence microscopy in scattering media", *Optics Letters*, vol. 19, No. 8, Apr. 15, 1994, pp. 590–592.

A. Sergeev, et al., "High–spatial–resolution optical–coherence tomography of human skin and mucous membranes", *Cleo '95 Technical Digest*, 1995, p. 349.

V. M. Gelikonov, et al., "Coherent optical tomography of microscopic inhomogeneities in biological tissues", *JETP Lett.*, vol. 61, No. 2, Jan. 25, 1995, pp. 158–162.

X. J. Wang, et al., "Characterization of human scalp hairs by optical low–coherence reflectometry", *Optics Letters*, vol. 20, No. 6, Mar. 15, 1995, pp. 524–526.

K. Takada, et al., "New measurement system for fault location in optical waveguide devices based on an interferometric technique", *Applied Optics*, vol. 26, No. 9 (May 1, 1987) pp. 1603–1606.

C. Hitzenberger, "Optical Measurement of the Axial Eye Length by Laser Doppler Interferometry", *Investigative Opthalmology & Visual Science*, vol. 32, No. 3 (Mar. 1991) pp. 616–624.

Spravochnik VOLS. "Volokonnye opticheskie linu soyazi", 1988, Tekhnika, (Kiev), pp. 34–35.

OPTICAL FIBER INTERFEROMETER WITH PZT SCANNING OF INTERFEROMETER ARM OPTICAL LENGTH

This is a continuation of application Ser. No. 08/602,589, filed Feb. 16, 1996, now abandoned.

BACKGROUND OF THE INVENTION

The present invention relates to engineering physics, in particular, the class of devices used in the study of internal structure of objects, and can be applied for medical diagnostics of individual organs and systems of human body, as well as for industrial diagnostics, for example, control of technological processes.

DESCRIPTION OF RELATED ART

Optical fiber interferometers also find application in apparatuses designed for studies of scattering media, in particular, optical coherence tomography of biological tissues (see J. A. Izatt, J. G. Fijimoto et al., Optical coherence microscopy in scattering media, OPTICS LETTERS, vol. 19, No. 8/Apr. 15, 1994, p. 590–592, and also X. Clivaz et al., High resolution reflectometry in biological tissues, OPTICS LETTERS, vol. 17, No. 1/Jan. 1, 1992). Both the said papers offer a description of the Michelson, optical fiber interferometer commonly comprising a coupler, a sampling arm provided with an optical probe at the end, and a reference arm incorporating an optical fiber piezoelectric phase modulator with a reference mirror installed at its end. Optical length of the reference arm can be varied within a fairly wide range by means of mechanical step-by-step alteration of the reference mirror position. Incorporation of a piezoelectric modulator of phase in the interferometer arm to suit the said interferometer for optical coherence tomography applications allows for lock-in detection of the information-carrying signal, thus providing a fairly high sensitivity of measurements, and by moving the reference mirror it is possible to perform the in-depth scanning of an object under study.

Among the known optical fiber interferometers comprising two couplers, the sampling and the reference arms is the device (Patent EPO N 0 362 474 B1, 17.03.93, Patentblatt 93/11) in which an optical fiber delay line in the form of an optical fiber loop serves as reference arm, and the sampling arm comprises a phase modulator. However, the reference arm of the said interferometer has a fixed optical length, which makes it unfit for optical coherence tomography devices.

Another known optical fiber interferometer suited for the optical coherence tomography is designed as Mach-Zender interferometer (see J. A. Izatt, J. G. Fujimoto, et al., Micron-resolution biomedical imaging with optical coherence tomography, Optics & Photonic News, October 1993, vol. 4, No. 10, p. 14–19) comprising the sampling and reference arms and two beam-splitters. This interferometer is used for measurements of scattered radiation in the plane parallel to the surface of tested sample, without scanning the sample in depth, hence it does not comprise a reference mirror. Modulation of interference signal is achieved by incorporating a fiber optic piezoelectric modulator into the reference arm of the interferometer.

Another available optical fiber interferometer is designed as the Michelson interferometer having a coupler, sampling and reference arms either of which comprises an optical fiber piezoelectric modulator. The sampling arm at the end has a measuring probe, the reference arm end being provided with a reference mirror (X. J. Wang et al., Characterization of human scalp hairs by optical low coherence reflectometry, OPTICS LETTERS, vol. 20, No. 5, 1995, pp. 524–526). The signals are modulated in both arms of the said interferometer, a relative phase shift is provided by both optical fiber piezoelectric modulators. The optical length of the sampling arm is changed by moving the reference mirror.

Major disadvantage inherent in all of the above-described fiber optic interferometers is the mechanical step-by-step moving of reference mirror in order to scan a test object in depth, which does not allow to study media that typically change their properties or position to the optical probe faster than the time required to take measurements that would ensure adequate reconstruction of the profile under study. It is clear, therefore, that the in vivo investigation of tissues is quite problematic, since they have to be rigidly fixed, which is impossible in some cases like, for example, with tissues of human eye.

The above paper by J. A. Izatt, J. G. Fujimoto et al. gives a description of a fiber interferometer for optical coherence tomography, designed as the Michelson interferometer comprising a coupler, a sampling arm with a measuring probe at the end, and a reference arm whose end is provided with a reference mirror movable at a constant speed. This arrangement allows for an in-depth scanning of objects, shorter sampling time than as with the step-by-step mechanism of mirror movement, and obviates the necessity for using a piezoelectric modulator, since the information-carrying signal is received in this case using a Doppler frequency shift induced in the reference arm by the constant speed movement of the reference mirror.

The closest analog of the present invention is the optical fiber interferometer incorporated in a device for optical coherence tomography (In vivo optical coherence tomography of human skin microstructure, A. Sergeev et al., Proc. SPIE, v. 2328, 1994, p. 144). The said interferometer comprises a coupler, sampling and reference arms, the sampling arm having an optical probe at the end, the reference arm incorporating a unit for changing the optical length of the said arm. This unit can be devised in the form of both an optical fiber piezoelectric modulator and a reference mirror installed at the end of the reference arm and having a capability of moving at a constant speed along the optical axis of the interferometer.

The disadvantage of the said interferometer, as of the one described by J. A. Izatt, J. G. Fujimoto et al., is that in optical coherence tomography applications for investigating internal structure of objects the mechanical system of constant speed moving of reference mirror in both these interferometers requires higher precision of mechanical scanning. Besides, in the in vivo studies of tissues the mechanical scanning system inertia sets the same limitations as the step-by-step reference mirror moving mechanism and, therefore, it is impossible to investigate the objects whose properties or position to the optical probe change in a shorter time than is required for measurements reliable enough to recover the test profile with sufficient accuracy. Varying the optical length of the fiber section of the reference arm by means of an optical piezoelectric modulator allows for faster scanning but at the expense of the scanning depth.

There is known an optical fiber piezoelectric modulator comprising a cylindrical body of plastic material having piezoelectric properties, with a coil of optical fiber embedded therein, the fiber coil axis being aligned with the longitudinal axis of the cylinder. The said modulator has electrodes deposited on the opposite ends of the cylinder (Patent application EPO N 0 356 056 A1 published 28.02.90 bul. 90/09).

Yet, since an increase in the coil diameter is directly proportional to the transverse-to-longitudinal size ratio of the cylinder, which is small for the said modulator, the optical fiber length within the cylinder can vary but by a small value (the order of units of operating wavelengths). Besides, a relatively large mass of the cylindrical body conditions its inertia. All these factors make the said fiber optic piezoelectric modulator unsuitable as means to ensure both desired depth of scanning and fast sampling rate in fiber optic interferometers.

The closest analog to the present invention is an optical fiber piezoelectric modulator according to patent application EPO N 0 460 635 A2 (published 11.12.91 bul. 91/50). The said modulator comprises a piezoceramic plate with electrodes located on the first and second opposite surfaces of the plate, and an optical fiber one part of which is fastened to one surface of the said piezoceramic plate so as to allow variation of the fiber length. This system has much less inertia and provides larger specific lengthening of optical fiber than the arrangement described above, owing to the piezoelectric part being formed as a thin disc. A large absolute lengthening of optical fiber is achieved by means of an in-series connection of a large number of piezoelectric elements.

However, this optical fiber piezoelectric modulator, being a one-plate structure, fails to provide sufficient absolute lengthening of optical fiber within the arm of interferometer used in the device for optical coherent tomography of biological tissues in vivo, and with the large quantity of the in-series-connected piezoelectric elements the modulator overall dimensions have to be increased, which essentially complicates the control system.

Thus, the present invention was devised in an attempt to construct an optical fiber interferometer providing, in the optical coherent tomography applications, a capability for investigating to sufficient depth of the media that quickly change their properties or position to the optical probe, as, for example, in the in vivo study of tissues.

Another problem to be solved by the present invention is the development of an optical fiber piezoelectric modulator suited for a fiber optic interferometer to provide a desired depth of scanning the media in which the characteristic time of changing their properties or position to an optical probe is small, as, for example, is the case of in vivo studies of tissues.

SUMMARY OF THE INVENTION

Essentially, the said fiber optic interferometer, similarly to its closest analog, comprises a coupler optically connected with the sampling and reference arms, either of which including a fiber section. The sampling arm is provided with an optical probe, and one of the arms of the said interferometer, for example, the reference one, comprises the first optical fiber piezoelectric modulator arranged so as to allow for varying the optical path of this arm.

The novelty offered by the present invention is that the first fiber optic piezoelectric modulator functions as the fiber part of the interferometer arm and is formed as a fiber optic piezoelectric controllable delay line allowing for changing the optical path of the interferometer arm by at least several tens of operating wavelengths of the interferometer.

In one embodiment, the sampling and reference arms of interferometer are designed so that their optical paths can be changed in anti-phase and, besides, one of the arms, for example, the sampling one, comprises a second (additional) piezoelectric modulator.

In a different embodiment the fiber part of the interferometer sampling arm is constructed similarly to the fiber part of the reference arm.

In the particular embodiment the optical fiber interferometer is based on anisotropic fiber.

Essentially, the developed optical fiber piezoelectric modulator, as its closest analog, comprises a piezoceramic plate having electrodes arranged on its first and second opposite surfaces, and an optical fiber whose first part is fastened to the first surface of the piezoceramic plate to allow variation of the fiber length.

The novelty of the present fiber optic piezoelectric modulator is that it is constructed in the form of a fiber optic piezoelectric controllable delay line, with the length of the first part of the optical fiber exceeding diameter of the said piezoceramic plate.

In one embodiment the first part of the optical fiber is arranged in the form of a coil on the first surface of the piezoceramic plate.

In a different embodiment the first part of the optical fiber is arranged so that its entire length is fastened to the first surface of the piezoceramic plate.

In another embodiment the second part of the optical fiber is fastened to the second surface of the piezoceramic plate.

In a different embodiment the length of the second part of optical fiber exceeds the diameter of the piezoceramic plate.

In the particular embodiment the second part of optical fiber is arranged in the form of a coil.

In another particular embodiment the second part of the optical fiber is fastened over the entire length to the second surface of the piezoceramic plate.

In a different particular embodiment a piezoceramic plate is formed as disc.

In particular embodiments the modulator is made with or using anisotropic fiber.

In the present fiber optic interferometer an optical fiber piezoelectric modulator in the form of an optical fiber delay line serves as the fiber part of the interferometer arm, which ensures a desired technical result, i.e., possibility to provide a practically inertialess, high-rate alteration of the interferometer optical path thus changing the difference in the optical paths of the arms by at least several tens of operating wavelengths of the said interferometer. This effect allows to apply the said fiber optic interferometer in the studies of media that typically change their characteristics or position to the optical probe in a very short time (about a second). Having the sampling and reference arms designed so as to provide anti-phase variation of their optical paths, and having the other arm's function also performed by an optical fiber piezoelectric modulator in the form of fiber optic controllable delay line enhances the technical result. Similar fib arrangements in the sampling and the reference arms of the interferometer allows to double the scan depth of an object under study without incorporating precise mechanical elements in the interferometer, the scanning control being made easier thereby.

The optical fiber piezoelectric modulator of the invention has been constructed as optical fiber piezoelectric controllable delay line, the optical fiber length exceeding diameter of the plate, the said fiber being fastened to two surfaces of the plate formed as disc, the fiber being arranged in the form of a coil and fastened over the entire length to the plate surface. This arrangement ensures a desired technical objective, i.e., possibility for changing the length of optical fiber within a wide range given absence of inertia and low overall dimensions of the modulator. This capability allows application of the said modulator in a fiber optic interferometer to provide a desired depth of scanning in media having small characteristic time of change in their properties and position to optical probe, like, for example, in the in vivo studies of tissues.

BRIEF DESCRIPTION OF THE DRAWINGS

Some particular embodiments of the invention will now be described with reference to the accompanying drawings, in which.

DESCRIPTION OF THE PREFERRED EMBODIMENTS

Figure 1:
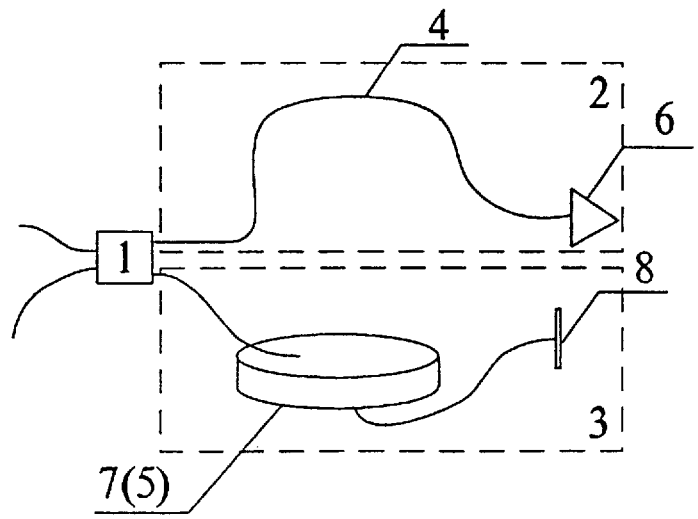
FIG. 1, 2 are schematic designs of the optical fiber single-mode interferometer of the invention as defined in claims 1 and 3 as filed.

As depicted in FIG. 1, the optical fiber interferometer is constructed in the form of Michelson interferometer comprising optically coupled coupler 1 and sampling and reference arms 2, 3, respectively, incorporating fibers 4, 5, respectively. The sampling arm 2 is provided at the end with optical probe 6, and the reference arm 3 comprises optical fiber piezoelectric modulator 7. The optical fiber piezoelectric modulator 7 functions as the fiber 5 of the interferometer arm 3 and is arranged in the form of the optical fiber delay line in which a capability is provided for varying the optical length of arm 3 by at least several tens of operating wavelengths of the said interferometer. The reference arm 3 is ended with a stationary reference mirror 8. The interferometer also comprises a source of control voltage applied to the optical fiber piezoelectric modulator 7 (it is not depicted in the drawing).

Figure 2:
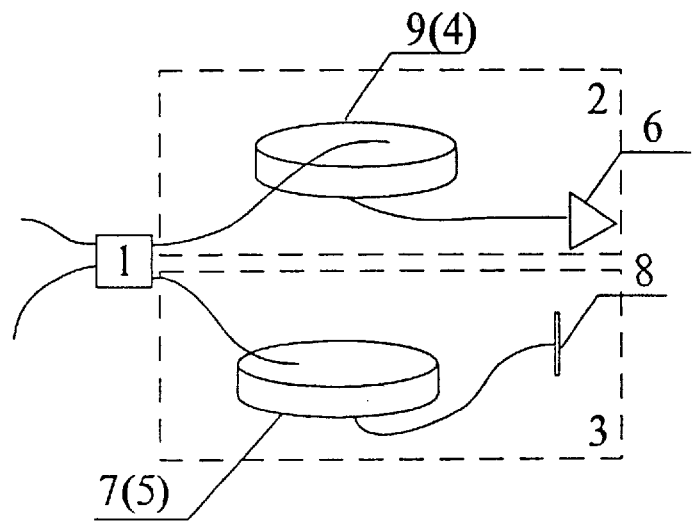

FIG. 2 shows an optical fiber Michelson-type interferometer having a coupler 1 optically connected with sampling and reference arms 2, 3, respectively, which comprise fibers 4, 5, respectively. The sampling arm 2 is provided at the end with optical probe 6, the reference arm 3 incorporates a stationary reference mirror 8. The sampling and reference arms 2, 3 have fiber optic piezoelectric modulators 9, 7, respectively, which perform the function of the fibers 4, 5, respectively, either of the said modulators being constructed in the form of optical fiber controllable delay line, which allows for changing the optical length of the respective arm by at least several tens of operating wavelengths of the interferometer (for example, as claimed in original claims 7–16).

The said interferometer also comprises a control voltage source to which the optical fiber piezoelectric modulators 7, 9 are connected in antiphase (this is not shown in the drawing).

Figure 3:
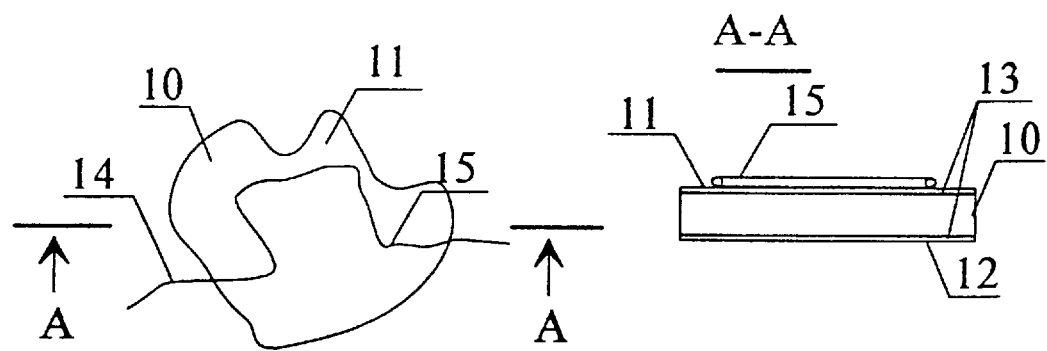
FIG. 3, 4, 5 depict particular embodiments of the developed optical fiber piezoelectric modulator (FIG. 3 is a top and cross-sectional view of the modulator as claimed in claim 7 as filed, FIG. 4 is a top view of the modulator as claimed in claim 8 as filed, FIG. 5 is a top and cross-sectional view of one particular embodiment of the modulator as claimed in claim 15 as filed).

The fiber optic piezoelectric modulator as shown in FIG. 3 comprises a piezoceramic plate 10 with the electrodes 13 located on the opposite surfaces 11, 12 of the said plate. The modulator also comprises an optical fiber 14, its first part 15 being arranged on the first surface 11 of the piezoceramic plate 10 so as to allow variation of the fiber length. The length of the first part 15 of the optical fiber 14 is larger than diameter of the piezoceramic plate 10.

Figure 4:
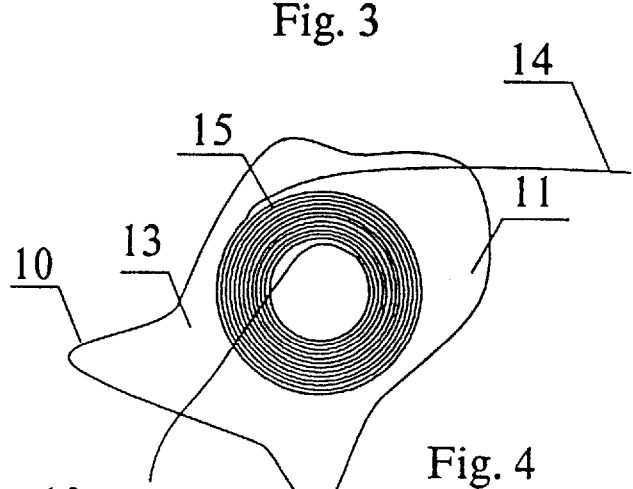

As depicted in FIG. 4, the first part 15 of the optical fiber 14 is arranged in the form of a coil within the optical piezoelectric modulator.

Figure 5:
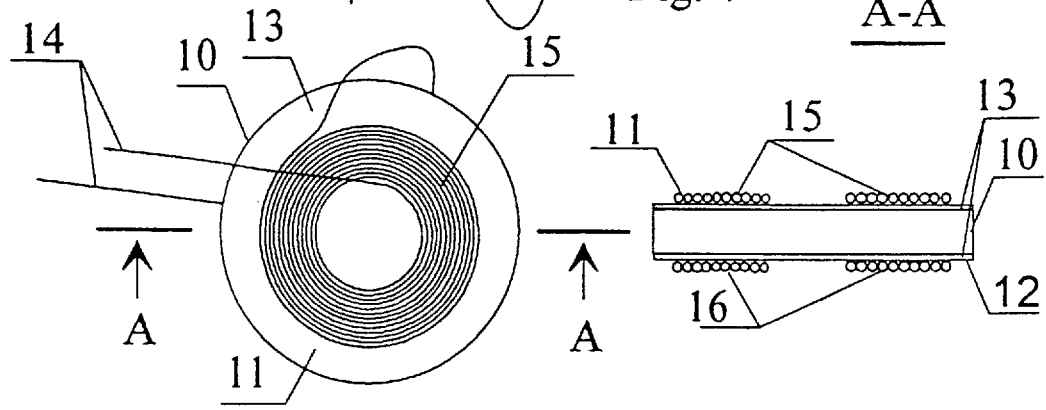

The optical piezoelectric modulator as shown in FIG. 5 has the optical fiber 14 fastened to the first surface 11 and the second surface 12 of the piezoceramic plate 10. The length of the first and second parts 15, 16, respectively, of the optical fiber 14, exceeds diameter of the piezoceramic plate 10. The first and the second parts 15, 16, respectively, are arranged in the form of a coil. The piezoceramic plate 10 is a disc in the optical fiber piezoelectric modulator in FIG. 5.

In a particular embodiment the first part 15 of the optical fiber 14 is fastened over the entire length on the first surface 11 of the piezoelectric plate 10 (not shown in the drawing).

A another particular embodiment the second part 16 of the optical fiber 14 is fastened over the entire length on the second surface 12 of the piezoceramic plate 10 (not shown in the drawing).

The optical fiber 14 as well as the fibers 4, 5 of the arms 2, 3, respectively, in the optical fiber interferometer of the invention may be a PANDA-type optical fiber.

The piezoelectric plate 10 may be made of a piezoelectric material exhibiting a strong perpendicular inverse piezoeffect, for example, of PZT-5 type.

The ratio of the plate 10 diameter to its thickness has to be chosen so as to provide a desired lengthening of the first and/or second parts 15, 16 of the optical fiber 14, with account of the particular configuration of the first and/or the second parts 15, 16 of the optical fiber 14.

The electrodes 12, 13 are metal, for example, silver. The optical probe 6 is essentially a lens system that serves for radiation focusing onto a test object and for guiding the scattered radiation back into the sampling arm 2, and must be optically connected with the fiber part 4 of the sampling arm 2.

The optical fiber interferometer of the invention, as depicted in FIG. 1, operates as follows.

The input radiation passes to coupler 1, the coupler 1 provides coupling of the radiation to both arms 2, 3 of the interferometer. The radiation is transmitted through the fiber part 4 of the sampling arm 2 to the optical probe 6, and through the fiber 5 of the reference arm 3 to the reference mirror 8. The optical probe 6 focuses the radiation on the test object and simultaneously guides back into the fiber 4 of the sampling arm 2 of the interferometer, while the reference mirror 8 reflects the incident radiation backward into the fiber 5 of the reference arm 3. The radiation scattered from the test object is transmitted through the fiber 4 of the sampling arm 2 to the coupler 1 where it interferes with the radiation arriving on the coupler 1 after being reflected by the reference mirror 8, via the fiber 5 of the reference arm 3. The function of the fiber 5 of the reference arm 3 is performed by the optical fiber piezoelectric modulator 7. Since the said modulator 7 is constructed in the form of an optical fiber controllable delay line to provide for variation of the optical path of the reference arm 3 by at least several tens of operating wavelengths of the interferometer, then, driven by the control voltage (not shown in the drawing), the said modulator 7 provides a change in the optical path of the reference arm 3 of the interferometer and, hence, a change in the difference of optical paths of the sampling and reference arms 2, 3 of the said interferometer by the rule of the control voltage, within the limits required for scanning a test object in depth. When the optical fiber interferometer as depicted in FIG. 1 is used in the device for optical coherence tomography, the information parameter will be the dependence of the interference signal intensity on the difference between optical lengths of the interferometer arms.

The optical fiber interferometer as shown in FIG. 2 operates similarly to that in FIG. 1. In this embodiment the function of the fiber part 4 of the sampling arm 2 is performed by the second optical fiber piezoelectric modulator 9, arranged in the form of optical fiber controllable delay line which allows for varying the optical length of the sampling arm 2 by at least several tens of operating wavelengths of the said interferometer. Therefore, under the control voltage (not shown in the drawing) both the piezoelectric modulators 9, 7 connected to the control voltage source in antiphase provide, in compliance with the rule of control voltage variation, a change in the difference between optical paths of the sampling and reference arms 2, 3 of the interferometer, within the range twice that for the embodiment as shown in FIG. 1.

The optical fiber piezoelectric modulator depicted in FIGS. 3, 4, 5 operates as follows.

The optical fiber piezoelectric modulator is constructed in the form of an optical fiber piezoelectric controllable delay line. The control voltage from the source (not shown in the drawing) is applied to electrodes 13 which produce a difference in the potentials ($\phi$) on the first and second surfaces 11, 12 of the piezoelectric plate 10, causing a perpendicular inverse piezoelectric effect in the plate 10. The absolute variation ($\Delta R$) of diameter of the first surface 11 of plate 10 is defined by the following expression:

$$\Delta R = \frac{R}{2h} d_{33} \phi$$

where R is the half-diameter of the first surface 11 of the plate 10; h is the thickness of plate 10; $d_{33}$ is the piezoelectric modulus.

An increase in the area of the first surface 11 of plate 10 according to the rule of control voltage variation causes stretching the first part 15 of the optical fiber 14 arranged on the said surface. Since the length of the first part 15 of optical fiber 14 exceeds diameter of the first surface 11 of the piezoceramic plate 10, the absolute lengthening of the first part 15 of optical fiber 14 is greater than $\Delta R$ and depends on the form the fiber is arranged on the first surface. According to the above expression, for an absolute lengthening of fiber by a value close to 1.5 mm it, about 15 m of optical fiber have to be arranged on the first surface 11 of the plate 10.

In the optical fiber piezoelectric modulator as shown in FIG. 4 the first part 15 of optical fiber 14 is arranged in the form of a coil. Therefore, absolute lengthening of the first part 15 of optical fiber 14 and, hence, its optical length may vary within the limits of at least several tens of radiation wavelengths in compliance with the rule of control voltage variation. This allows application of the optical fiber piezoelectric modulator in the optical fiber interferometer of the invention for providing a desired depth of scanning the media that change their properties and position to optical probe in a very short time, as, for example, is the case of the in vivo studies of tissues. In the embodiment depicted in FIG. 5 the coil-like form of arranging the first and the second parts 15, 16, of optical fiber 14 on both surfaces 11, 12 of plate 10 allows to-extend the scanning area into the depth of a test object.

Although the preferred embodiments of the invention have been shown and described, it should be understood that various modifications and rearrangements of the parts may be resorted to without departing from the scope of the invention as disclosed and claimed herein.

What is claimed is:

1. An optical fiber interferometer comprising a coupler optically connected with a sampling arm and a reference arm, each of said arms including an optical fiber part, one of said arms comprising a first optical fiber piezoelectric transducer, said sampling arm having an optical probe, said first transducer comprising at least one body (a) having piezoelectric properties and (b) exhibiting a perpendicular inverse piezoeffect, said first transducer having electrodes, said first transducer having an electric field vector when an electric field is applied to said electrodes, said body having a thickness in a direction substantially aligned with said electric field vector and having a width in a direction substantially perpendicular to said electric field vector, said thickness being substantially smaller than said width, an optical fiber being mechanically connected with said body effective to allow changing of the optical length of the interferometer arm comprising said first transducer by at least several tens of operating wavelengths of the interferometer, said first transducer serving as a scanning element, wherein said first optical fiber piezoelectric transducer comprises a piezoelectric plate with electrodes located on first and second opposite surfaces of said plate, a first optical fiber part of said interferometer arm comprising said first transducer being mechanically connected to said first surface of said piezoelectric plate so that the optical length of said arm comprising said first transducer can be varied.

2. An optical fiber interferometer as claimed in claim 1, wherein the other of said arms comprises a second optical fiber piezoelectric transducer in order to allow antiphase scanning of the optical lengths of said sampling and reference arms.

3. An optical fiber interferometer as claimed in claim 1, wherein the other of said arms comprises a second optical fiber piezoelectric transducer, said second transducer comprising a second body (a) having piezoelectric properties and (b) exhibiting a perpendicular inverse piezoeffect, said second transducer having second electrodes, said second transducer having a second electric field vector when an electric field is applied to said second electrodes, said second body having a second thickness in a direction substantially aligned with said second electric field vector and having a second width in a direction substantially perpendicular to said second electric field vector, said second thickness being substantially smaller than said second width, an optical fiber being mechanically connected with said second body effective to allow changing of the optical length of the interferometer arm comprising said second transducer by at least several tens of operating wavelengths of the interferometer.

4. An optical fiber interferometer as claimed in claim 3, said optical fiber part being included in each of said arms being anisotropic fiber part, said optical fiber connected with said second body being anisotropic fiber.

5. An optical fiber interferometer as claimed in claim 1, said optical fiber being mechanically connected with said body being anisotropic fiber.

6. An optical fiber interferometer as claimed in claim 1, said optical fiber part being included in each of said arms being anisotropic fiber part.

7. An optical fiber interferometer as claimed in claim 1, said piezoelectric plate having a diameter, the length of said first fiber part of said interferometer arm comprising said first transducer substantially exceeding said diameter of said piezoelectric plate.

8. An optical fiber interferometer as claimed in claim 7, wherein said first fiber part is arranged in a form of a coil.

9. An optical fiber interferometer as claimed in claim 8, wherein said first fiber part is coiled at least 13 times.

10. An optical fiber interferometer as claimed in claim 7, said first fiber part having an entire length, said first fiber part being; mechanically connected over said entire length to said first surface of said piezoelectric plate.

11. An optical fiber interferometer as claimed in claim 7, wherein a second optical fiber part of said interferometer arm comprising said first transducer is mechanically connected to said second surface of said piezoelectric plate.

12. An optical fiber interferometer as claimed in claim 11, wherein the length of said second fiber part substantially exceeds said diameter of said piezoelectric plate.

13. An optical fiber interferometer as claimed in claim 12, wherein said second fiber part is arranged in a form of a coil.

14. An optical fiber interferometer as claimed in claim 11, wherein said second fiber part is arranged in a form of a coil.

15. An optical fiber interferometer as claimed in claim 14, said piezoelectric plate being a piezoceramic plate, said first fiber part being arranged in a form of a coil, said plate having the shape of a disc, a first electrode being located on said first surface of said plate, said first electrode being positioned between said first fiber part and said plate, a second electrode being located on said second surface of said plate, said second electrode being positioned between said second fiber part and said plate, said width being at least several times said thickness.

16. An optical fiber interferometer as claimed in claim 11, said second fiber part having an entire length, said second fiber part being mechanically connected over said entire length to said second surface of said piezoelectric plate.

17. An optical fiber interferometer as claimed in claim 11, a second electrode being located on said second surface of said plate, said second fiber part being fastened to said second electrode.

18. An optical fiber interferometer as claimed in claim 17, said second electrode being positioned between said second fiber part and said plate.

19. An optical fiber interferometer as claimed in claim 7, wherein said piezoelectric plate is formed as a disc.

20. An optic fiber interferometer as claimed in claim 7, the length of said first fiber part substantially exceeding said width of said body.

21. An optical fiber interferometer as claimed in claim 1, said body being a piezoceramic plate.

22. An optical fiber interferometer as claimed in claim 1, a first electrode being located on said first surface of said plate, said first fiber part being fastened to said first electrode.

23. An optical fiber interferometer as claimed in claim 22, said first electrode being positioned between said first fiber part and said plate.

24. An optical fiber interferometer as claimed in claim 1, said width being at least several times said thickness.

25. An optical fiber interferometer as claimed in claim 1, said width being at least about 8 times said thickness.

26. An optical fiber interferometer as claimed in claim 1, each of said electrodes being flat.

27. An optical fiber interferometer as claimed in claim 1, said optical fiber being mechanically connected with said body having a length of at least 15 meters.

* * * * *

UNITED STATES PATENT AND TRADEMARK OFFICE
CERTIFICATE OF CORRECTION

PATENT NO. : 5,867,268
DATED : February 2, 1999
INVENTOR(S) : Valentin M. Gelikonov, et al.

It is certified that error appears in the above-identified patent and that said Letters Patent is hereby corrected as shown below:

Column 1, line 25, after "Michelson" delete --,--.

Column 6, line 8, after "14" delete --,--.

Column 6, line 15, "A another" should be --In another--.

Column 7, line 44, "AR" should be --$\Delta$R--.

Column 7, line 62, after "16" delete --,--.

Column 7, line 63, "to-extend" should be --to extend--.

Signed and Sealed this

Twenty-seventh Day of July, 1999

Attest:

Q. TODD DICKINSON

*Attesting Officer*   *Acting Commissioner of Patents and Trademarks*